(12) United States Patent
Kasamatsu

(10) Patent No.: US 7,804,617 B2
(45) Date of Patent: Sep. 28, 2010

(54) NETWORK SYSTEM, REMOTE SETUP METHOD AND CONNECTION DATA EDIT PROGRAM

(75) Inventor: Daisuke Kasamatsu, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1198 days.

(21) Appl. No.: 11/405,454

(22) Filed: Apr. 18, 2006

(65) Prior Publication Data
US 2006/0232819 A1    Oct. 19, 2006

(30) Foreign Application Priority Data
Apr. 18, 2005    (JP) ............... 2005-120360

(51) Int. Cl.
*G06F 15/00* (2006.01)
*G06F 15/16* (2006.01)

(52) U.S. Cl. ..................... 358/1.16; 709/203

(58) Field of Classification Search ........... 358/1.16, 358/1.15, 1.13, 1.14, 1.18, 296, 448, 498, 358/488, 518, 1.8, 1.6, 3.23, 400, 402, 403, 358/302; 709/204, 203, 227, 217, 223, 226, 709/224; 715/205, 746, 740; 455/557, 410, 455/411, 243, 418; 718/102; 382/243
See application file for complete search history.

(56) References Cited

U.S. PATENT DOCUMENTS 6,148,346 A * 11/2000 Hanson ............... 719/321
2005/0048953 A1    3/2005 Ohara

FOREIGN PATENT DOCUMENTS

| JP | 61-131943 | 6/1986 |
|---|---|---|
| JP | 2001-222475 | 8/2001 |
| JP | 2001251337 | 9/2001 |
| JP | 2005-079896 | 3/2005 |

OTHER PUBLICATIONS

Japanese Office Action, with English Translation, issued in Japanese Patent Application No. JP 2005-120360 dated on Oct. 14, 2008.
Japanese Notification of Reasons of Rejection, with English Translation, issued in Japanese Patent Application No. JP 2005-120360, mailed Feb. 26, 2008.

* cited by examiner

*Primary Examiner*—Saeid Ebrahimi Dehkordy
(74) *Attorney, Agent, or Firm*—Scully, Scott, Murphy & Presser, P.C.

(57) ABSTRACT

A network system for remotely setting up a network device from a host terminal, the network device and the host terminal being connected to a network is provided. The network device includes a storage unit configured to store setting information, and a controller which performs a controlling operation in accordance with the setting information stored in the storage unit. The host terminal includes a display unit on which information is displayed, and an input unit configured to accept user operation. The network system has a first state in which the controller of the network device operates to display the setting information on the display unit in response to a first signal being inputted to the controller through the input unit of the host terminal, and a second state in which the controller of the network device operates to display the setting information on the display unit in such a manner that editing of the setting information is allowed in response to a second signal being inputted to the controller via the network through use of the input unit of the host terminal during the first state.

24 Claims, 9 Drawing Sheets

☒ Edit Network Settings
(Improper configuration may cause your machine
to be disconnected from your network)

Setup TCP/IP

| | | |
|---|---|---|
| BOOT Method | Static ▼ | |
| IP Address | 010 . 142 . 040 . 070 | |
| Subnet Mask | 255 . 255 . 000 . 000 | |
| Gateway | 010 . 142 . 254 . 254 | |
| Host Name | *_** | |
| WINS Config | Auto ▼ | |
| WINS Server | | |
|     Primary | 133 . 151 . 111 . 102 | |
|     Secondary | 133 . 151 . 111 . 103 | |
| DNS Server | Static ▼ | |
|     Primary | 133 . 151 . 111 . 103 | |
|     Secondary | 133 . 151 . 111 . 103 | |
| APIPA | On ▼ | |

[ OK ]  [ Cancel ]  [ Apply ]

FIG. 7

NETWORK SYSTEM, REMOTE SETUP METHOD AND CONNECTION DATA EDIT PROGRAM

CROSS-REFERENCE TO RELATED APPLICATION

This application claims priority under 35 U.S.C. §119 from Japanese Patent Application No. 2005-120360, filed on Apr. 18, 2005. The entire subject matter of the application is incorporated herein by reference.

FIELD OF THE INVENTION

Aspects of the present invention relate to a setting change method for conducting setting and maintenance of a device on a network from a remote host computer by a remote operation.

BACKGROUND ART

A network device, which is, for example, a multifunction device having functions as a printer and a scanner, is connected to a LAN (Local Area Network). Such a network device is shared between computers connected to the LAN.

For example, as shown in Japanese Patent Provisional Publication No. 2001-251337 (hereafter, referred to as JP2001-251337A), a user configures network settings of a network device from a computer through a network. However, in this case, there is a possibility that a user carelessly changes the network settings. If the settings are erroneously changed, a possibility, that the computer becomes unable to access the network device via the network, arises.

SUMMARY OF THE INVENTION

An advantage of the present invention is a network system configured such that a host terminal is able to remotely set up a network device, and network settings are prevented from being carelessly changed by a user.

According to the present invention, the foregoing and other advantages are achieved in part by a network system for remotely setting up a network device from a host terminal, the network device and the host terminal being connected to a network. The network device includes a storage unit configured to store setting information, and a controller which performs a controlling operation in accordance with the setting information stored in the storage unit. The host terminal includes a display unit on which information is displayed, and an input unit configured to accept user operation. The network system has a first state in which the controller of the network device operates to display the setting information on the display unit in response to a first signal being inputted to the controller through the input unit of the host terminal, and a second state in which the controller of the network device operates to display the setting information on the display unit in such a manner that editing of the setting information is allowed in response to a second signal being inputted to the controller via the network through use of the input unit of the host terminal during the first state.

Another aspect of the present invention is a network system for remotely setting up a network device from a host terminal, the network device and the host terminal being connected to a network. The network device includes a storage unit configured to store setting information, and a controller which performs a controlling operation in accordance with the setting information stored in the storage unit. The host terminal includes a host side storage unit configured to store data, a display unit on which information is displayed, and an input unit configured to accept user operation. The network system has a first state in which the controller of the network device operates to store the setting information into the host side storage unit and to display the setting information on the display unit in such a manner that editing of the setting information is not allowed, in response to a first signal being inputted to the controller via the network through use of the input unit of the host terminal; and a second state in which the setting information stored in the host side storage unit is displayed on the display unit in such a manner that editing of the setting information is allowed in response to a second signal being inputted through use of the input unit of the host terminal during the first state. In this configuration, the setting information stored in the network device is changed based on the setting information edited and stored in the host side storage unit and an update command inputted through the input unit in the second state.

A further aspect of the present invention is a computer program product for use on a host terminal which is connected to a network device via a network in a network system, wherein the network device includes a storage unit configured to store setting information and a controller which performs a controlling operation in accordance with the setting information stored in the storage unit, wherein the host terminal includes a host side storage unit configured to store data, a display unit on which information is displayed, and an input unit configured to accept user operation. The computer program product comprising computer readable instructions that cause the host terminal to: store the setting information into the host side storage unit and to display the setting information on the display unit in such a manner that editing of the setting information is not allowed, in response to a first signal being inputted to the controller via the network through use of the input unit of the host terminal; to display the setting information stored in the host side storage unit on the display unit in such a manner that editing of the setting information is allowed in response to a second signal being inputted through use of the input unit of the host terminal during a first state in which editing of the setting information is not allowed; and to change the setting information stored in the network device based on the setting information edited and stored in the host side storage unit and an update command inputted through the input unit in a second state in which editing of the setting information is allowed.

A still further aspect of the present invention is a computer program product for use on a network device which is connected to a host terminal via a network in a network system, wherein the network device includes a storage unit configured to store setting information, and a controller which performs a controlling operation in accordance with the setting information stored in the storage unit, wherein the host terminal includes a display unit on which information is displayed, and an input unit configured to accept user operation. The computer program product comprising computer readable instructions that cause the network device to: display the setting information on the display unit in response to a first signal being inputted to the controller through the input unit of the host terminal; and to display the setting information on the display unit in such a manner that editing of the setting information is allowed in response to a second signal being inputted to the controller via the network through use of the input unit of the host terminal.

A still further aspect of the present invention is a method of remotely setting up a network device from a host terminal, the network device and the host terminal being connected to a network, wherein the network device includes a storage unit configured to store setting information, and a controller which performs a controlling operation in accordance with the setting information stored in the storage unit, wherein the host terminal includes a display unit on which information is displayed, and an input unit configured to accept user operation. The method comprising the steps of: displaying the setting information on the display unit in response to a first signal being inputted to the controller through the input unit of the host terminal, and displaying the setting information on the display unit in such a manner that editing of the setting information is allowed in response to a second signal being inputted to the controller via the network through use of the input unit of the host terminal.

A still further aspect of the present invention is a method of remotely setting up a network device from a host terminal which is connected to the network device via a network in a network system, wherein the network device includes a storage unit configured to store setting information and a controller which performs a controlling operation in accordance with the setting information stored in the storage unit, wherein the host terminal includes a host side storage unit configured to store data, a display unit on which information is displayed, and an input unit configured to accept user operation. The method comprising the steps of: storing the setting information into the host side storage unit and displaying the setting information on the display unit in such a manner that editing of the setting information is not allowed, in response to a first signal being inputted to the controller via the network through use of the input unit of the host terminal; displaying the setting information stored in the host side storage unit on the display unit in such a manner that editing of the setting information is allowed in response to a second signal being inputted through use of the input unit of the host terminal during a first state in which editing of the setting information is not allowed; and changing the setting information stored in the network device based on the setting information edited and stored in the host side storage unit and an update command inputted through the input unit in a second state in which editing of the setting information is allowed.

Additional advantages of the present invention will become readily apparent to those skilled in this art from the following detailed description, wherein only selected embodiments of the present invention are shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE ACCOMPANYING DRAWINGS

FIG. 1 schematically illustrates a network system according to the present invention.

FIG. 7 shows an example of a connection data edit window in which editing of settings is allowed.

DETAILED DESCRIPTION

General Overview

Figure 1:
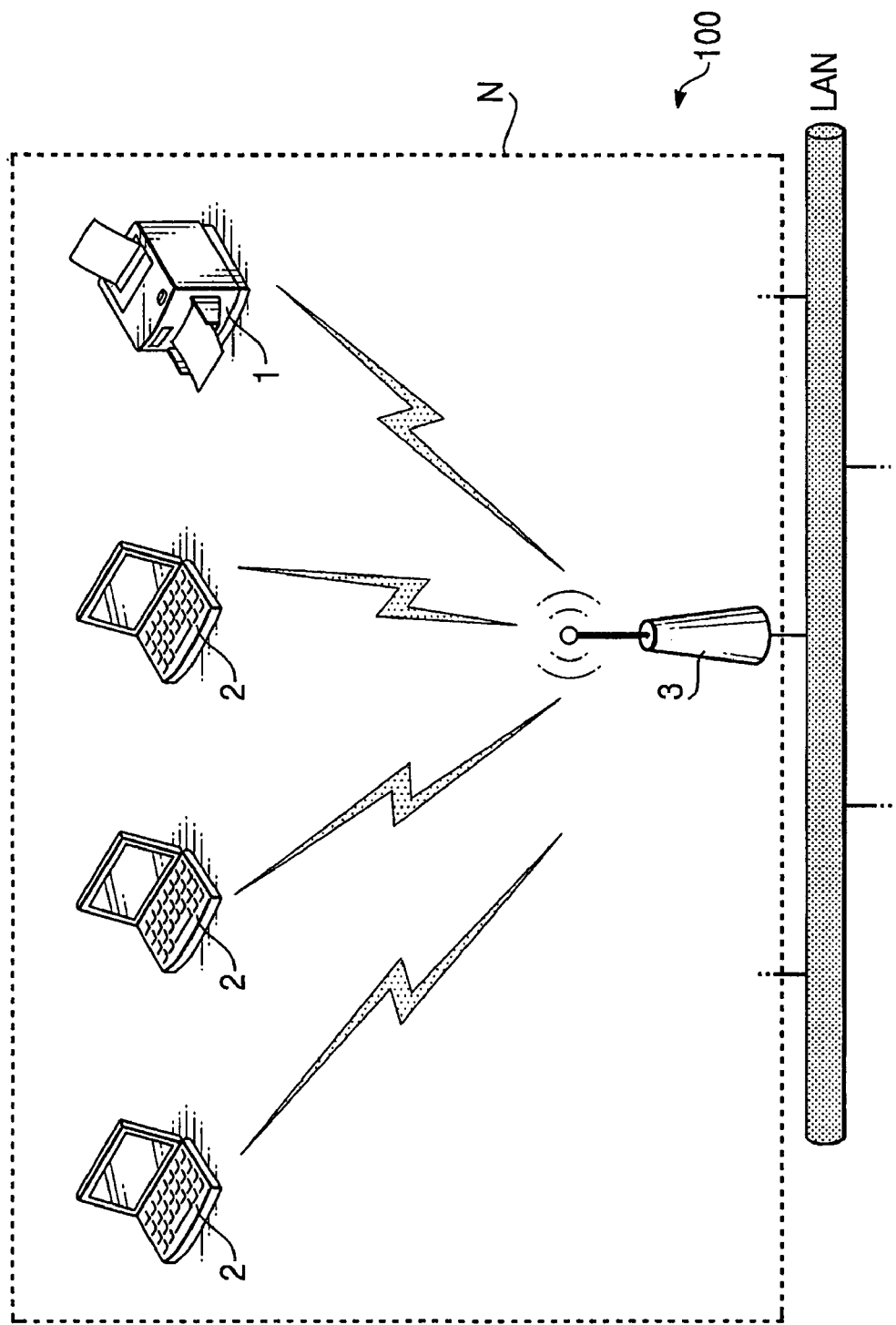

According to the present invention, the foregoing and other advantages are achieved in part by a network system for remotely setting up a network device from a host terminal, the network device and the host terminal being connected to a network. The network device includes a storage unit configured to store setting information, and a controller which performs a controlling operation in accordance with the setting information stored in the storage unit. The host terminal includes a display unit on which information is displayed, and an input unit configured to accept user operation. The network system has a first state in which the controller of the network device operates to display the setting information on the display unit in response to a first signal being inputted to the controller through the input unit of the host terminal, and a second state in which the controller of the network device operates to display the setting information on the display unit in such a manner that editing of the setting information is allowed in response to a second signal being inputted to the controller via the network through use of the input unit of the host terminal during the first state.

With this configuration, it is possible to browse and edit connection data from the host terminal connected to the network device. It is possible to prevent the connection data from carelessly changed by the user. Therefore, it is possible to prevent the host terminal from being disconnected from the network device by operation mistakes.

Optionally, in the first state, the controller may display the setting information in an input field of a window on the display unit in such a manner that browsing of the setting information is allowed. The controller displays the setting information in such a manner that editing of the setting information is allowed in response to the second signal being inputted.

Still optionally, whether the second signal is outputted or not may be determined according to whether a check box of a dialog box is checked in the first state.

Still optionally, the controller may set an input field of a dialog box for a first background color in the first state, and may set the input field of the dialog box for a second background color in the second state.

Still optionally, a connection data edit window displayed during the first state may include a warning.

Still optionally, a connection data edit window displayed in the first state may include an input portion for an edit instruction and a warning. In this case, the input portion is displayed alongside the warning.

Still optionally, connection data of the setting information may include an address of the network device.

Still optionally, the network device may includes a communication unit configured to communicate with an wireless access point or a wireless terminal, and connection data of the setting information includes data for establishing a connection with the wireless access point or the wireless terminal.

Still optionally, the network device may include a password storage unit configured to store a password, a comparing unit configured to make a comparison for the password, and a window providing unit configured to provide an edit window if a password from the host terminal coincides with the password stored in the password storage unit.

According to another aspect of the invention, there is provided a network system for remotely setting up a network device from a host terminal, the network device and the host terminal being connected to a network. The network device includes a storage unit configured to store setting information, and a controller which performs a controlling operation in accordance with the setting information stored in the storage unit. The host terminal includes a host side storage unit configured to store data, a display unit on which information is displayed, and an input unit configured to accept user operation. The network system has a first state in which the controller of the network device operates to store the setting information into the host side storage unit and to display the setting information on the display unit in such a manner that editing of the setting information is not allowed, in response to a first signal being inputted to the controller via the network through use of the input unit of the host terminal; and a second state in which the setting information stored in the host side storage unit is displayed on the display unit in such a manner that editing of the setting information is allowed in response to a second signal being inputted through use of the input unit of the host terminal during the first state. In this configuration, the setting information stored in the network device is changed based on the setting information edited and stored in the host side storage unit and an update command inputted through the input unit in the second state.

With this configuration, it is possible to browse and edit connection data from the host terminal connected to the network device. It is possible to prevent the connection data from carelessly changed by the user. Therefore, it is possible to prevent the host terminal from being disconnected from the network device by operation mistakes.

A further aspect of the present invention is a computer program product for use on a host terminal which is connected to a network device via a network in a network system, wherein the network device includes a storage unit configured to store setting information and a controller which performs a controlling operation in accordance with the setting information stored in the storage unit, wherein the host terminal includes a host side storage unit configured to store data, a display unit on which information is displayed, and an input unit configured to accept user operation. The computer program product comprising computer readable instructions that cause the host terminal to: store the setting information into the host side storage unit and to display the setting information on the display unit in such a manner that editing of the setting information is not allowed, in response to a first signal being inputted to the controller via the network through use of the input unit of the host terminal; to display the setting information stored in the host side storage unit on the display unit in such a manner that editing of the setting information is allowed in response to a second signal being inputted through use of the input unit of the host terminal during a first state in which editing of the setting information is not allowed; and to change the setting information stored in the network device based on the setting information edited and stored in the host side storage unit and an update command inputted through the input unit in a second state in which editing of the setting information is allowed.

With this configuration, it is possible to browse and edit connection data from the host terminal connected to the network device. It is possible to prevent the connection data from carelessly changed by the user. Therefore, it is possible to prevent the host terminal from being disconnected from the network device by operation mistakes.

Optionally, in the first state, the setting information may be displayed in an input field of a window on the display unit in such a manner that browsing of the setting information is allowed.

Still optionally, whether the second signal is outputted or not may be determined according to whether a check box of a dialog box is checked in the first state.

Still optionally, the instructions may further cause the host terminal to set an input field of a dialog box for a first background color in the first state, and to set the input field of the dialog box for a second background color in the second state.

Still optionally, a connection data edit window displayed during the first state may include a warning.

Still optionally, a connection data edit window displayed in the first state may include an input portion for an edit instruction and a warning, and the input portion may be displayed alongside the warning.

Still optionally, connection data of the setting information may include an address of the network device.

The computer program product may be a memory that stores the instructions. The memory is a computer hard disk or a removable memory. The computer program product may be a carrier wave in which the instructions are embodied.

A still further aspect of the present invention is a computer program product for use on a network device which is connected to a host terminal via a network in a network system, wherein the network device includes a storage unit configured to store setting information, and a controller which performs a controlling operation in accordance with the setting information stored in the storage unit, wherein the host terminal includes a display unit on which information is displayed, and an input unit configured to accept user operation. The computer program product comprising computer readable instructions that cause the network device to: display the setting information on the display unit in response to a first signal being inputted to the controller through the input unit of the host terminal; and to display the setting information on the display unit in such a manner that editing of the setting information is allowed in response to a second signal being inputted to the controller via the network through use of the input unit of the host terminal.

With this configuration, it is possible to browse and edit connection data from the host terminal connected to the network device. It is possible to prevent the connection data from carelessly changed by the user. Therefore, it is possible to prevent the host terminal from being disconnected from the network device by operation mistakes.

A still further aspect of the present invention is a method of remotely setting up a network device from a host terminal, the network device and the host terminal being connected to a network, wherein the network device includes a storage unit configured to store setting information, and a controller which performs a controlling operation in accordance with the setting information stored in the storage unit, wherein the host terminal includes a display unit on which information is displayed, and an input unit configured to accept user operation. The method comprising the steps of: displaying the setting information on the display unit in response to a first signal being inputted to the controller through the input unit of the host terminal, and displaying the setting information on the display unit in such a manner that editing of the setting information is allowed in response to a second signal being inputted to the controller via the network through use of the input unit of the host terminal.

With this configuration, it is possible to browse and edit connection data from the host terminal connected to the network device. It is possible to prevent the connection data from carelessly changed by the user. Therefore, it is possible to prevent the host terminal from being disconnected from the network device by operation mistakes.

A still further aspect of the present invention is a method of remotely setting up a network device from a host terminal which is connected to the network device via a network in a network system, wherein the network device includes a storage unit configured to store setting information and a controller which performs a controlling operation in accordance with the setting information stored in the storage unit, wherein the host terminal includes a host side storage unit configured to store data, a display unit on which information is displayed, and an input unit configured to accept user operation. The method comprising the steps of: storing the setting information into the host side storage unit and displaying the setting information on the display unit in such a manner that editing of the setting information is not allowed, in response to a first signal being inputted to the controller via the network through use of the input unit of the host terminal; displaying the setting information stored in the host side storage unit on the display unit in such a manner that editing of the setting information is allowed in response to a second signal being inputted through use of the input unit of the host terminal during a first state in which editing of the setting information is not allowed; and changing the setting information stored in the network device based on the setting information edited and stored in the host side storage unit and an update command inputted through the input unit in a second state in which editing of the setting information is allowed.

With this configuration, it is possible to browse and edit connection data from the host terminal connected to the network device. It is possible to prevent the connection data from carelessly changed by the user. Therefore, it is possible to prevent the host terminal from being disconnected from the network device by operation mistakes.

The device and method according to the present invention can be realized when appropriate programs are provided and executed by a computer. Such programs may be stored and distributed in a recording medium such as a flexible disk, CD-ROM, memory cards and the like. Alternatively or optionally, such programs can be distributed through networks such as the Internet.

ILLUSTRATIVE EMBODIMENTS

Hereafter, an illustrative embodiment of the present invention will be described with reference to the accompanying drawings.

First Embodiment

FIG. 1 schematically illustrates a network system 100 according to a first embodiment of the invention. In this embodiment, a printer 1 has a function as a network device. That is, the printer 1 is connected to more than one computer 2 (by their wireless communication terminals) via a network N and is able to perform bidirectional communications with each computer 2. The network N is a wireless LAN (Local Area Network). Each of the printer 1 and the computers 2 is incorporated in the network N by establishing a wireless connection with a wireless access point 3. Since the computers 2 have the same configuration, the configuration of one of them is explained in the following for the sake of simplicity.

Although in the network system 100 shown FIG. 1 only computers 2 are employed as communication terminals capable of communicating with the network device (the printer 1), various types of devices such as a mobile phone can be employed in the network system 100 as communication terminals.

The printer 1 is a multifunction device (hereafter "MFD") having multiple functions such as a printer function, a scanner function and a copying function, and is able to record images and text on a recording sheet in accordance with print data including image data and document data transmitted from the computer 2. However, the printer 1 may be configured to have a printing function only. The printer 1 may be configured such that an external device such as a digital camera can be connected thereto to record an image corresponding to image data transmitted from the digital camera on a recording sheet (e.g., photo paper), or may be configured such that a storage medium such as a memory card can be attached thereto to record images stored in the storage medium on recording sheets.

Figure 2:
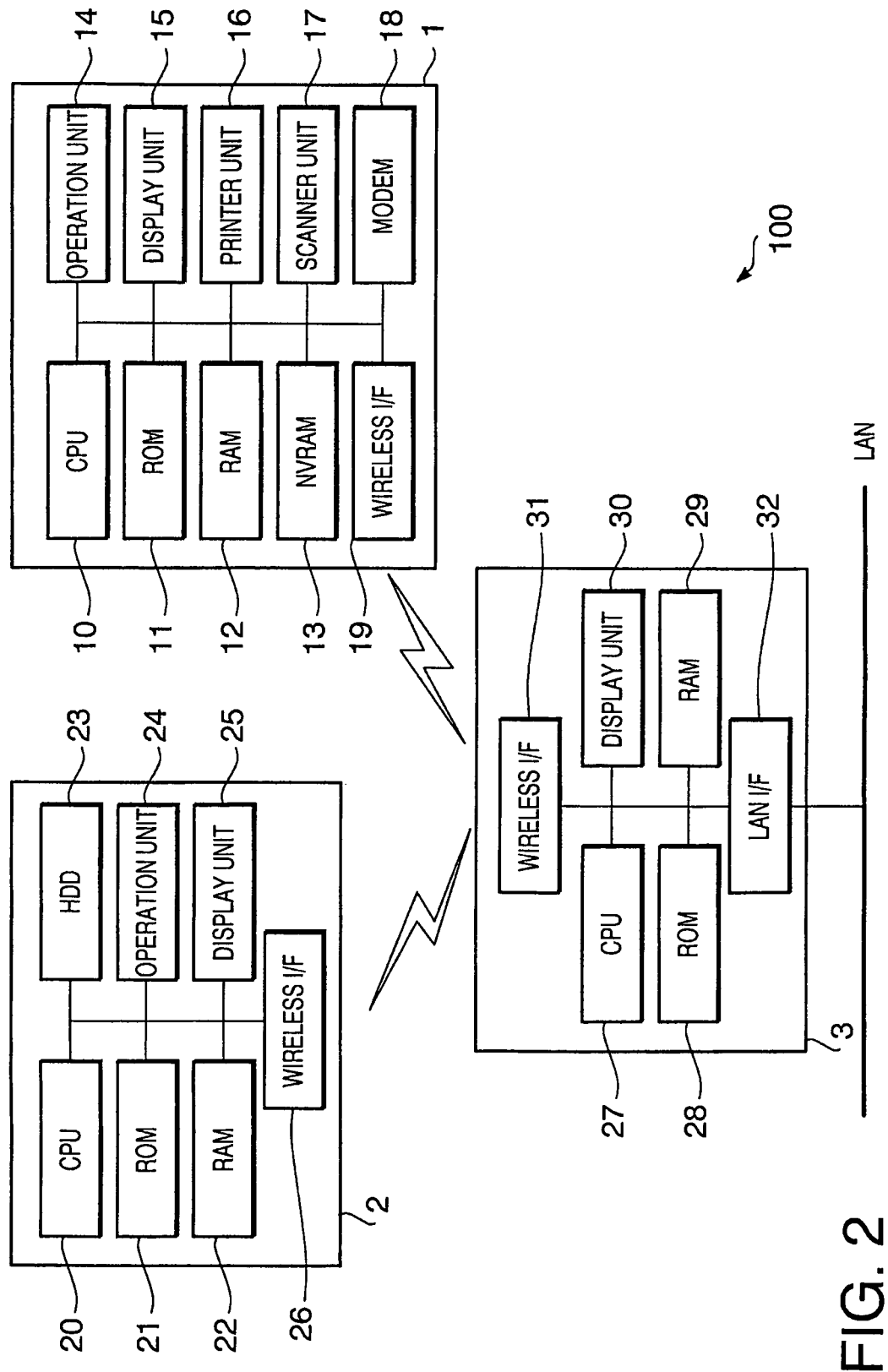
FIG. 2 is a block diagram of the network system shown in FIG. 1.

FIG. 2 is a block diagram of the network system 100 shown in FIG. 1. As shown in FIG. 2, the printer 1 includes a CPU 10, a ROM 11, a RAM 12, a NV (non-volatile) RAM 13, an operation unit 14, a display unit 15, a printing unit 16, a scanner unit 17, a modem 18, and a wireless interface (I/F) 19.

In the ROM 11, programs for performing the functions of the printer 1 are stored. The RAM 12 is used to temporarily store data for execution of the programs in the ROM 11, and to temporarily store image data obtained by the scanner function or print data to be subjected to a printing operation by the printing function.

In the NVRAM 13, various types of setting data to be retained in a power off state of the printer 1 are stored. In this embodiment, connection data, which is used by the printer 1 to establish a wireless connection with the wireless access point 3, and a password for offering of a connection data edit window, are stored in NVRAM 13.

The connection data includes various types of settings used to establish a connection with the network N. If settings of the connection data are changed erroneously, the established connection between the printer 1 and the wireless access point 3 is disconnected. Settings required to establish a connection with the wireless access point 3 vary depending on a communication protocol standard on which the network N is based and a security level of the wireless LAN (e.g., an encryption scheme). In this embodiment, the settings of the connection data include an identification used to identify a network (a connection target), a network address, and an encryption key used to encrypt data.

The operation unit 14 includes various types of operation buttons. The display unit 15 includes an LCD (liquid crystal display) panel. The printer 1 is able to operate according to commands inputted through the operation unit 14 and is able to operate in accordance with commands transmitted from the computer 2 via a printer driver. The printer 1 also displays the connection data and the password on the display unit 15 stored in the NVRAM 13. With this configuration, a user is able to input initial settings to establish a connection between the printer 1 and the wireless access point 3 through the operation unit 14 and the display unit 15.

An image corresponding to print data transmitted from the computer 2 or facsimile data transmitted from an external device is printed on a recording medium by the printing unit 16. The printing unit 16 may be configured to perform a printing operation using a printing scheme such as inkjet printing, laser printing or thermal printing.

The scanner unit 17 can be configured as a flat head scanner or can be configured to read an image from an original carried by an automatic document feeder (ADF). If the scanner unit 17 is configured as a flat head scanner, the printer 1 is configured such that a platen glass and an image sensor are located under an openable and closable top cover, and the image sensor is mounted in the printer 1 to scan an image formed on an original placed on the platen glass.

The modem 18 is used to perform voice communications and data communications with an external device via a public network. The modem 18 is used when the facsimile function is used on the printer 1. The wireless interface 19 performs data communications with the wireless access point 3 by a wireless signal, such as a radio wave or infrared light.

The computer 2 has a card slot to which a wireless LAN card (wireless interface 26) is attached so that the computer 2 functions as a wireless communication terminal. As shown in FIG. 2, the computer 2 includes a CPU 20, a ROM 21, a RAM 22, a hard disk drive (HDD) 23, an operation unit 24, a display unit 25, and the wireless interface (I/F) 26. In the ROM 21, various programs for control of the computer 2 are stored. The RAM 22 is used to temporarily store data used for execution of programs by the CPU 20. In the HDD 23, various types of application programs and data files are stored.

The operation unit 24 includes a keyboard and a pointing device. The display unit 25 may be a CRT or a LCD. The wireless interface 26 is used to perform wireless communications.

The wireless access point 3 includes a CPU 27, a ROM 28, a RAM 29, a display unit 30, a wireless interface (I/F) 31, and a LAN interface (I/F) 32. In the ROM 28, programs for control of the function of the wireless access point 3 are stored. The RAM 29 is used to temporarily store data used for execution of programs by the CPU 27. The display unit 30 is a LCD or LEDs through which a status of the wireless access point 3 is notified to a user. The wireless interface 31 operates to perform data communications with the computer 2 or the printer 1 using a wireless signal, for example, a radio wave or infrared light. The LAN interface 32 interfaces the wireless access point 3 with a wired LAN.

Figure 3:
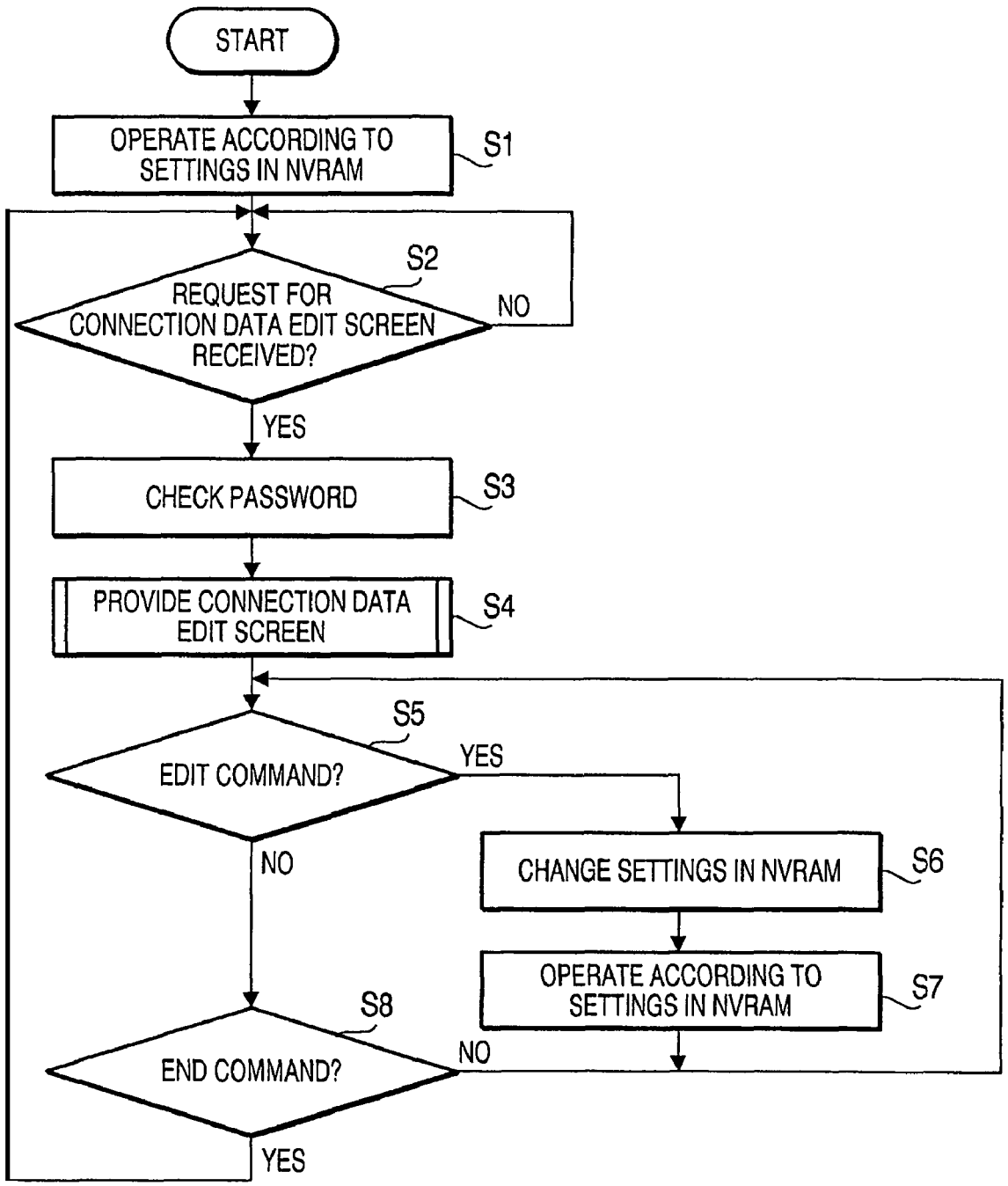
FIG. 3 is a flowchart illustrating an operation of a printer in a remote setup process according to a first embodiment of the present invention.
Figure 4:
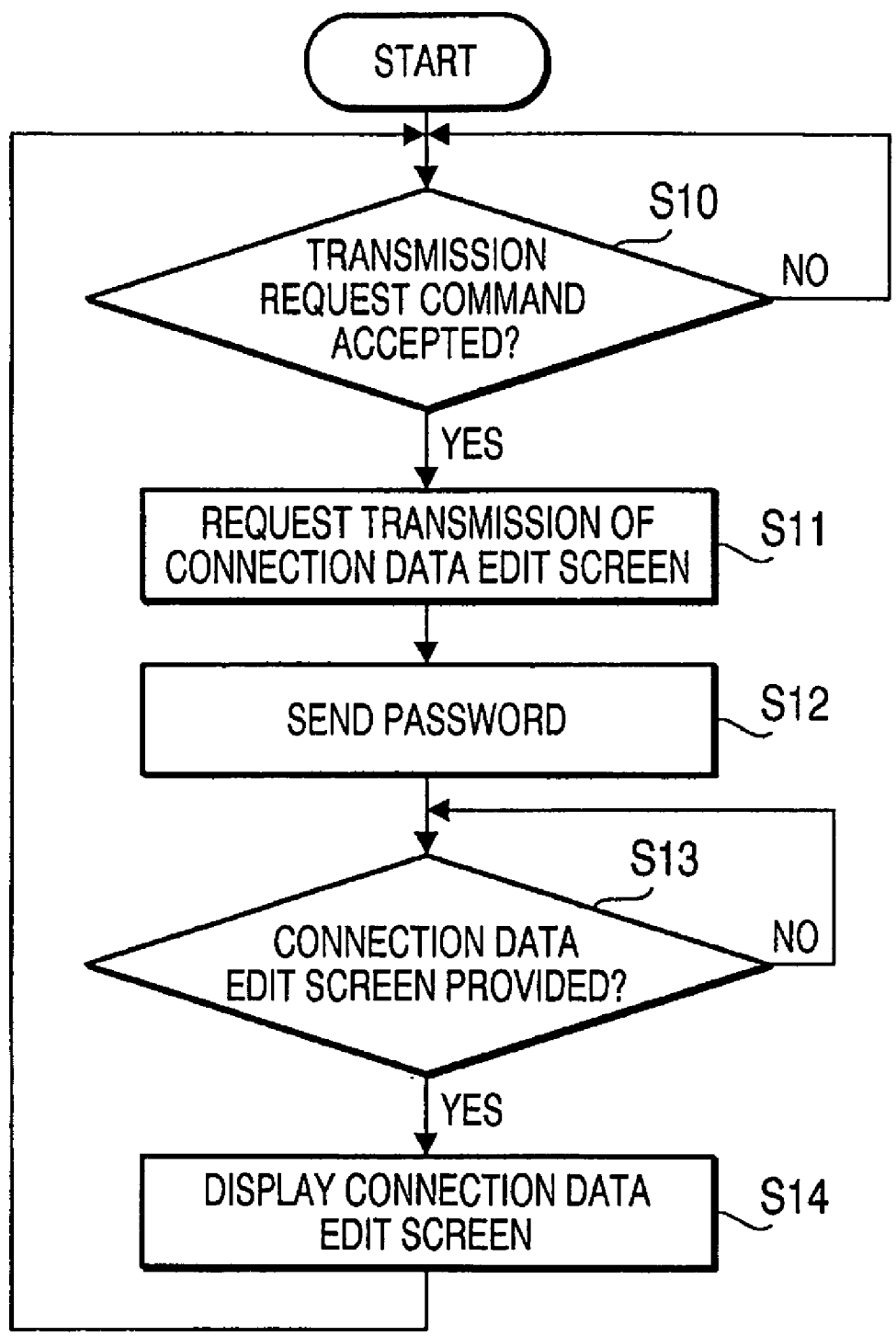
FIG. 4 is a flowchart illustrating an operation of a computer in the remote setup process according to the first embodiment of the present invention.
Figure 5:
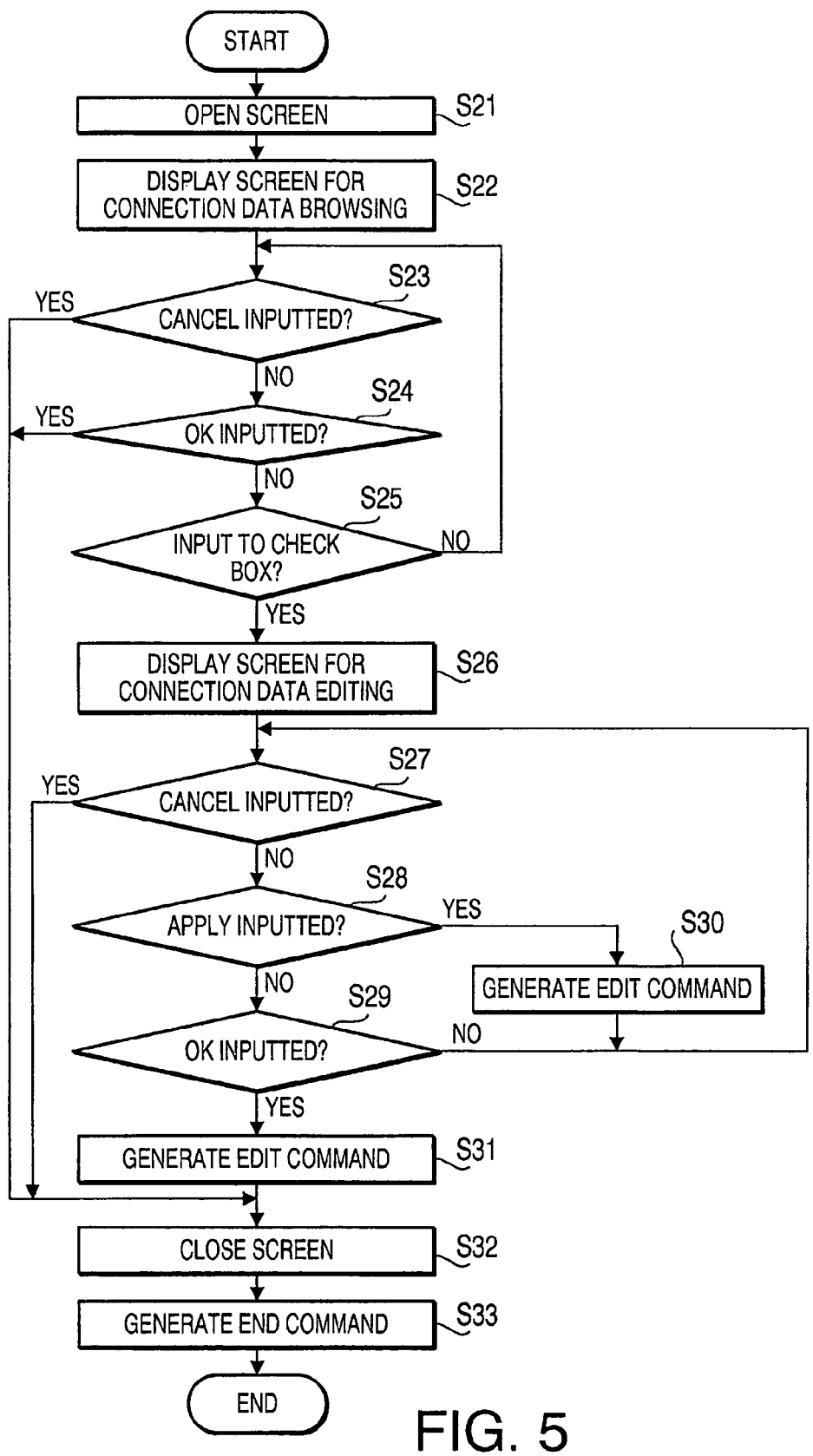
FIG. 5 is a flowchart illustrating a process for providing a connection data edit window according to the first embodiment of the present invention.

Operations of the printer 1 and the computer 2 in a remote setup process is described. FIGS. 3 and 5 show operations performed under control of the CPU 10 of the printer 1 in the remote setup process. FIG. 4 shows an operation performed under control of the CPU 20 of the computer 2 in the remote setup process.

When the printer 1 is turned on, the process shown in FIG. 3 is initiated. First, the printer 1 starts to operate based on the connection data stored in the NVRAM 13 (step S1). In the NVRAM 13, settings for various items regarding the function of the printer 1 are stored, in addition to the connection data. The CPU 10 establishes a connection with the wireless access point 3 by controlling the wireless interface 19 based on the connection data stored in the NVRAM 13, so that the printer 1 is incorporated into the network N.

Next, the printer 1 waits until a transmission request for a connection data edit window is transmitted from the computer 2 (step S2: NO). In this stage, if a print command from the computer 2 or a command from an external device (e.g., a facsimile device) is received, the printer 2 is able to process such incoming commands.

On the other hand, as shown in FIG. 4, when the computer 2 is turned on, the computer 2 is incorporated into the network N. Then, the computer 2 waits until an input for the remote setup is accepted. A user is able to start the remote setup by initiating an application program for the remote setup on the computer 2. After the application program is initiated on the computer 2, the user is able to input a command of a transmission request for a connection data edit window. If the transmission request command is accepted (step S10: YES), the computer 2 sends the transmission request for a connection data edit window to the printer 1 via the wireless interface 26 and the network N (step S11).

Further, the computer 2 displays a password input screen on the display unit 25. If the user inputs a password through the password input screen, the computer 2 sends the password to the printer 1 via the wireless interface 26 and the network N (step S12).

As shown in FIG. 3, after the printer 1 receives the transmission request for a connection data edit window (step S2: YES), the printer 1 checks the received password (step S3). Specifically, in step S3, the CPU 10 of the printer 1 reads a password, which is stored in the NVRAM 13 in association with the connection data edit window according to a control program in the ROM 11, from the NVRAM 13, and then compares the password read from the NVRAM 13 with the received password. If these passwords coincide with each other, the printer 1 provides the connection data edit window for the computer 2 (step S4).

The connection data edit window is generated by the CPU 10 by reading the connection data stored in the NVRAM 13 according to a program stored in the ROM 11. The generated connection data edit window is stored in the RAM 21 temporarily, and thereafter is provided for the computer 2 which accessed the printer 1 via the network N.

If the passwords do not coincide with each other, the printer 1 requests the computer 2 to re-input a password. Responding to the request for re-input of a password, the computer 2 displays the password input screen again. By such a configuration, it is possible to prevent an unauthorized user (a user not allowed to edit connection data) from editing connection data of the printer 1 through the network N.

Figure 6:
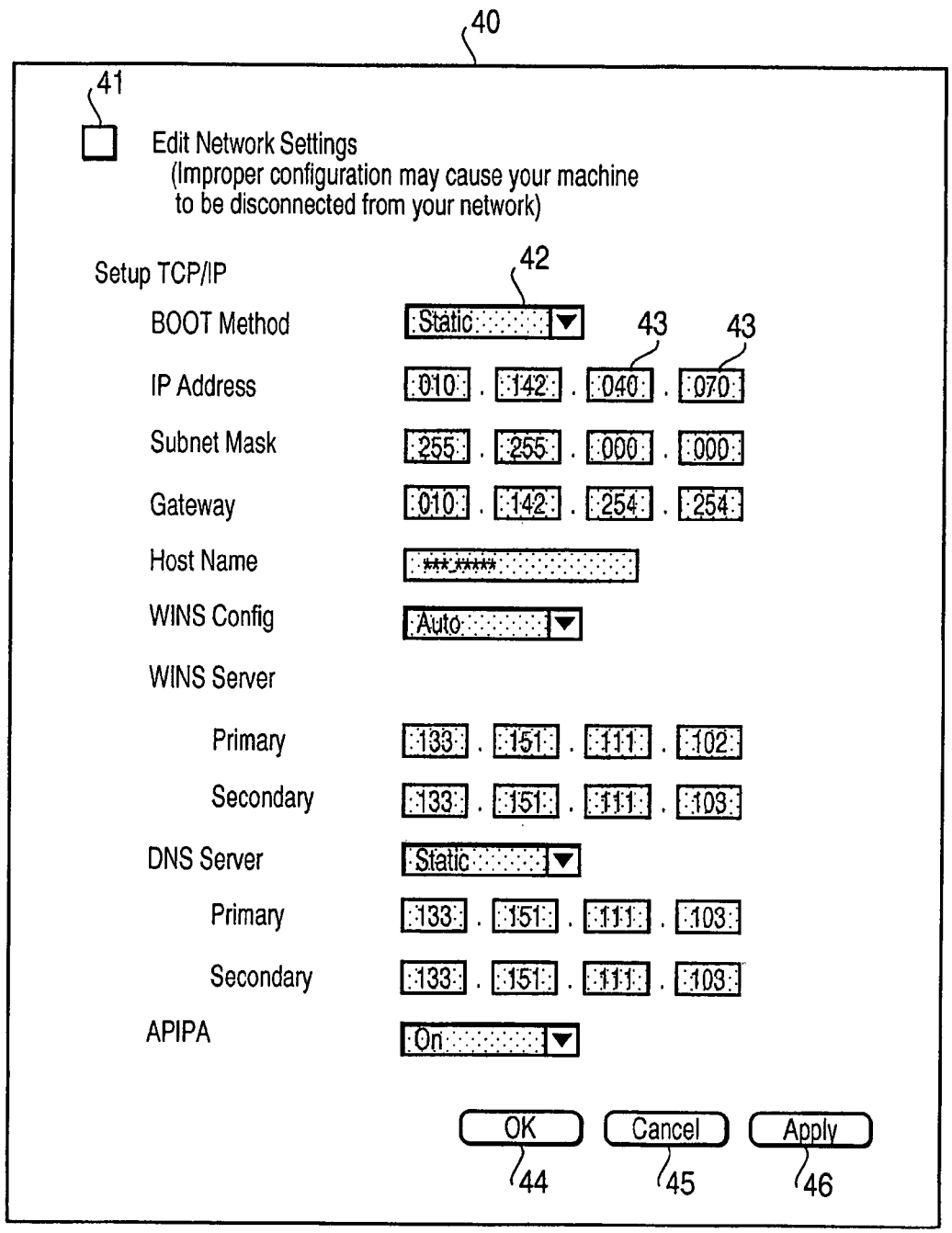
FIG. 6 shows an example of a connection data edit window in which only browsing of settings is allowed.

Providing of the connection data edit window by the printer 1 will now be described with reference to FIG. 5. By providing a connection data edit window 40 from the printer 1 to the computer 2, the connection data edit window 40 is displayed on the display 25 of the computer 2 (step S21). The connection data edit window is displayed in such a manner that only reading is allowed (step S22). FIG. 6 shows an example of a connection data edit window in which only reading of settings is allowed. As shown in FIG. 6, each display field of a box of the connection data is displayed in grayout. That is, display fields of the items of the connection data are displayed in a gray background (first background) color. Through this connection data edit window, the user is able to browse the settings of the connection data currently set for the printer 1.

The user is only allowed to browse the connection data through the connection data edit window shown in FIG. 6, and is not allowed to edit the connection data. Therefore, even if a pointer of the pointing device is located on each box of the connection data displayed in grayout and then the pointing device is clicked, the cursor does not move to the display field. By such a configuration, each item on a display field displayed in grayout is prevented from being edited carelessly by a user.

In FIG. 6, the boxes displayed below "Setup TCP/IP" are the connection data of the printer 1. Values of these items (boxes) are read from the NVRAM 13 and are displayed on the connection data edit window. More specifically, "BOOT method" is an item for designating a sequence of operations to be automatically performed by the printer 1 between the time of power on of the printer 1 and a time when operation of the printer 1 becomes available. "Static" displayed in this item means that routing of wireless LAN communications is set for static routing (i.e., routing data is set as static data). In the "BOOT method" item, a user is able to designate a routing manner in which routing is automatically updated (i.e., a so-called dynamic routing).

"IP address" is an item for designating an address of the printer 1, and is represented by a combination of a network address and a host address. The expression of an address of the printer 1 displayed on the item "IP address" may vary depending on a protocol on which the network N is based. "Subnet Mask" is an item for representing a bit line for division into subnets in a network containing the network N. "Gateway" is an item for an address corresponding to a certain protocol in a hierarchical protocol structure. For example, the item "Gateway" represents an address of a router interconnecting devices in a network layer.

"Host name" is an item for representing a name assigned to the printer 1 in the network N. "Wins Server" is an item for representing a server in which a database for associating a name of each device (e.g., the printer 1 or the computer 2) with an IP address is stored. "DNS Server" represents a server storing a list in which host names are associated with respective IP addresses. Two servers (the primary and secondary servers) can be set for each of the items of "WINS Server" and "DNS Server". "APIPA" is an item for designating an ON/OFF state of the function of automatic allocation of an IP address. As illustrated in FIG. 6, these boxes of the connection data are displayed in a gray background color.

At the bottom portion of the window shown in FIG. 6, three buttons "OK" button 44, "Cancel" button 45 and "Apply" button 46 are displayed. The user selects and presses one of these buttons depending on a command to be inputted. If the "OK" button 44 or the "Cancel" button 45 is clicked by the user through the connection data edit window through which the user is only allowed to browse the connection data (step S23: YES or step S24: YES), the printer 1 closes the window (step S32). Then, an end commend is generated (step S33).

As shown in FIG. 3, if the end command is generated (step S8: YES), the printer 1 changes to a standby state without changing the connection data in the NVRAM 13. That is, the "Cancel" button 45 is used as a command for canceling the already conducted remote setup operation. The "OK" button 44 is used as a command for closing the connection data edit window and for terminating the remote setup.

At the top portion of the connection data edit window, an item for inputting an edit allowance command for changing the state of the window to a state in which editing for the items are allowed is displayed. Specifically, at the top of the connection data edit window, the words "Edit Network Settings" are displayed, and a check box 41 is displayed on the left side thereof. By moving the pointer of the pointing device to the position of the check box 41 and clicking the pointing device, the user is able to input the edit allowance command through the connection data edit window on which the user is only allowed to browse the items.

Under the item "Edit Network Settings", a warning message indicating that improper configuration may cause your machine to be disconnected from your network is displayed on the window. Through this warning message, the user notices that if improper modification is made on the connection data carelessly, trouble may occur on the network (e.g., the computer 2 is disconnected from the printer 1). Since the warning message is displayed alongside of the check box 41 on the edit window, the user necessarily notices the warning message when the user inputs the edit allowance command through the check box 41. Such a configuration prevents a user who is not familiar with a network from carelessly editing the connection data.

If the user checks the check box 41 (step S25: YES), the connection data edit window changes to a window in which editing for the connection data is allowed (step S26). FIG. 7 shows the state of the window in which editing for the connection data is allowed. As shown in FIG. 7, a check mark is displayed on the check box 41. The background color of a list box 42 of "BOOT Method", each text box 43 of "IP Address", "Subnet Mask", "Gateway", "Host Name", "WINS Server", "DNS Server" and a list box of "APIPA" displayed under the "Setup TCP/IP" has been changed from gray to white (i.e., a second background color). Such a change in background color enables the user to easily notice that the connection data edit window has been changed to the state in which the editing of the items is allowed.

The user is able to edit the items of the connection data by moving a cursor to each box on the connection data edit window. If the user moves the pointer of the pointing device to a box having the white background color and then clicks the pointing device, a cursor moves to the box. The user is able to edit the connection data of the box, for example using a keyboard. Although in this embodiment gray is used as the background color (first background color) representing the inhibit state of editing and white is used as the background color (second background color) representing the allowed state of editing, various types of combinations of the first and second background colors may be adopted as long as the difference between the first and second background colors is recognizable for the user on the window.

If the user clicks the "Cancel" button 45 on the connection data edit window (step S27: YES), the window closes regardless of whether the user has edited the connection data (step S32). Then, an end command is generated (step S33).

As shown in FIG. 3, if the end command is generated (step S8: YES), the printer 1 changes to a standby state without changing the connection data in the NVRAM 13. As in the case of the window shown in FIG. 6, the "Cancel" button 45 in the window shown in FIG. 7 is also used as a command for canceling the already conducted remote setup operation.

If an "Apply" button 46 on the connection data edit window in which the user is allowed to edit the settings is clicked (step S28: YES), the printer 1 generates an edit command based on the connection data currently set for the connection data edit window (step S30). That is, the "Apply" button 46 is used as a command representing the completion of editing of the connection data. The CPU 20 detects that the cursor has moved to the list box or the text box. By the edit command, connection data inputted to the detected box is sent to the printer 1.

As shown in FIG. 3, if the edit command is generated (step S5: YES), control proceeds to step S6 where the CPU 10 of the printer 1 changes the settings of the connection data in the NVRAM 13 based on the edited connection data (step S6). That is, the CPU 10 functions to edit the connection data in the NVRAM 13 using the settings inputted through the connection data edit window, and to store the edited connection data into the NVRAM 13. Then, the CPU 10 of the printer 1 establishes a connection with the network N based on the changed connection data (step S7).

If the user clicks the "OK" button 44 in the connection data edit window in which the user is allowed to edit the settings (step S29: YES), the CPU 10 of the printer 1 generates an edit command for the connection data currently inputted to the connection data edit window (step S31). Next, the printer 1 closes the window (step S32). Then, an end command is generated (step S33). That is, the "OK" button 44 is used as a command representing the completion of editing of the connection data and completion of the remote setup.

As shown in FIG. 3, if the edit command is generated (step S5: YES), control proceeds to step S6 where the CPU 10 of the printer 1 changes the settings of the connection data in the NVRAM 13 based on the edited connection data. Then, the CPU 10 of the printer 1 establishes a connection with the network based on the changed connection data (step S7). If the end command is generated (step S8: YES), the remote setup is terminated and the printer 1 changes to a standby state.

As described above, according to this embodiment, the connection data edit window provided by the printer 1 for the computer 2 via the network N is displayed in such a manner that the user is only allowed to browse the settings. In order to edit the connection data, the user is required to input the edit allowance command. Therefore, the connection data is not edited carelessly by the user unless the edit allowance command is inputted. Such a configuration makes it possible to prevent the network settings of the printer 1 from being carelessly changed by the user.

Although in this embodiment the printer 1 is connected to the computer 2 via the wireless LAN, the present invention can be applied to various types of network systems, such as a network system in which the printer 1 is connected to the computer 2 via a LAN cable or a network system in which the printer 1 and more than computer 2 are connected to each other via a wireless LAN and/or a LAN cable.

The window shown in each of FIGS. 6 and 7 is one example of a connection data edit window. The connection data edit window may be modified without departing from the scope of the invention. For example, a radio button may be used in place of the check box. The warning message may be displayed above the input field for the edit allowance command. The connection data edit window may be formed using one of various types of languages. The window may be configured such that only the connection data is displayed by omitting boxes.

Second Embodiment

A network system according to a second embodiment of the present invention will now be described. The system configuration and the block diagram shown in FIGS. 1 and 2 are used for the explanations of the network system according to the second embodiment.

In this embodiment, a connection data editing program which is installed in the computer 2 as an application program functions, when executed, to receive connection data from the printer 1, to generate a connection data edit window in which a user is allowed to browse and edit settings of the connection data, and to display the connection data edit window on the display unit 25 of the computer 2. In the NVRAM 13 of the printer 1, a password used for providing the connection data is stored. The connection data editing program is stored in the HDD 23 as an application program.

Figure 8:
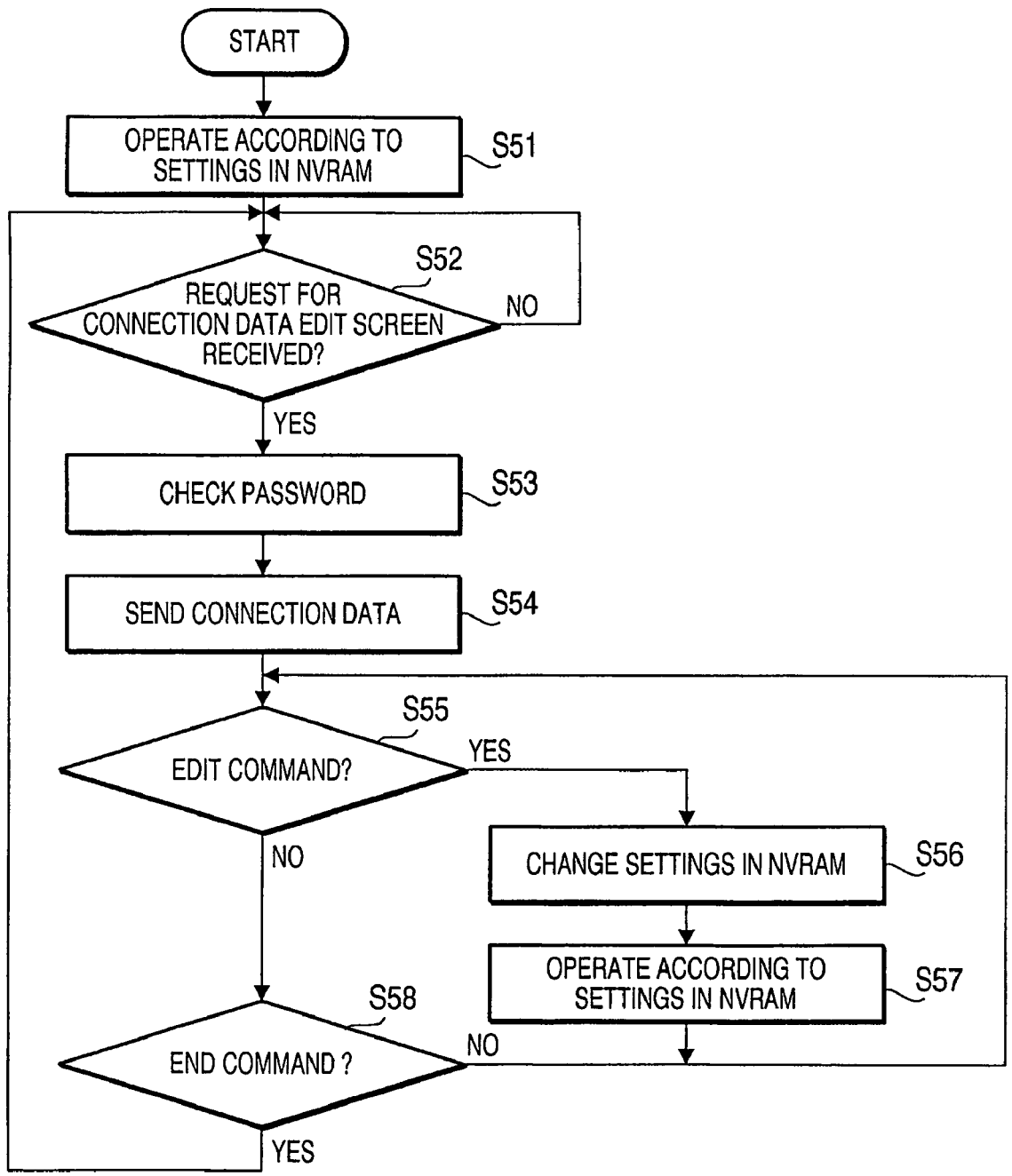
FIG. 8 is a flowchart illustrating an operation of the printer in a remote setup process according to a second embodiment of the present invention.
Figure 9:
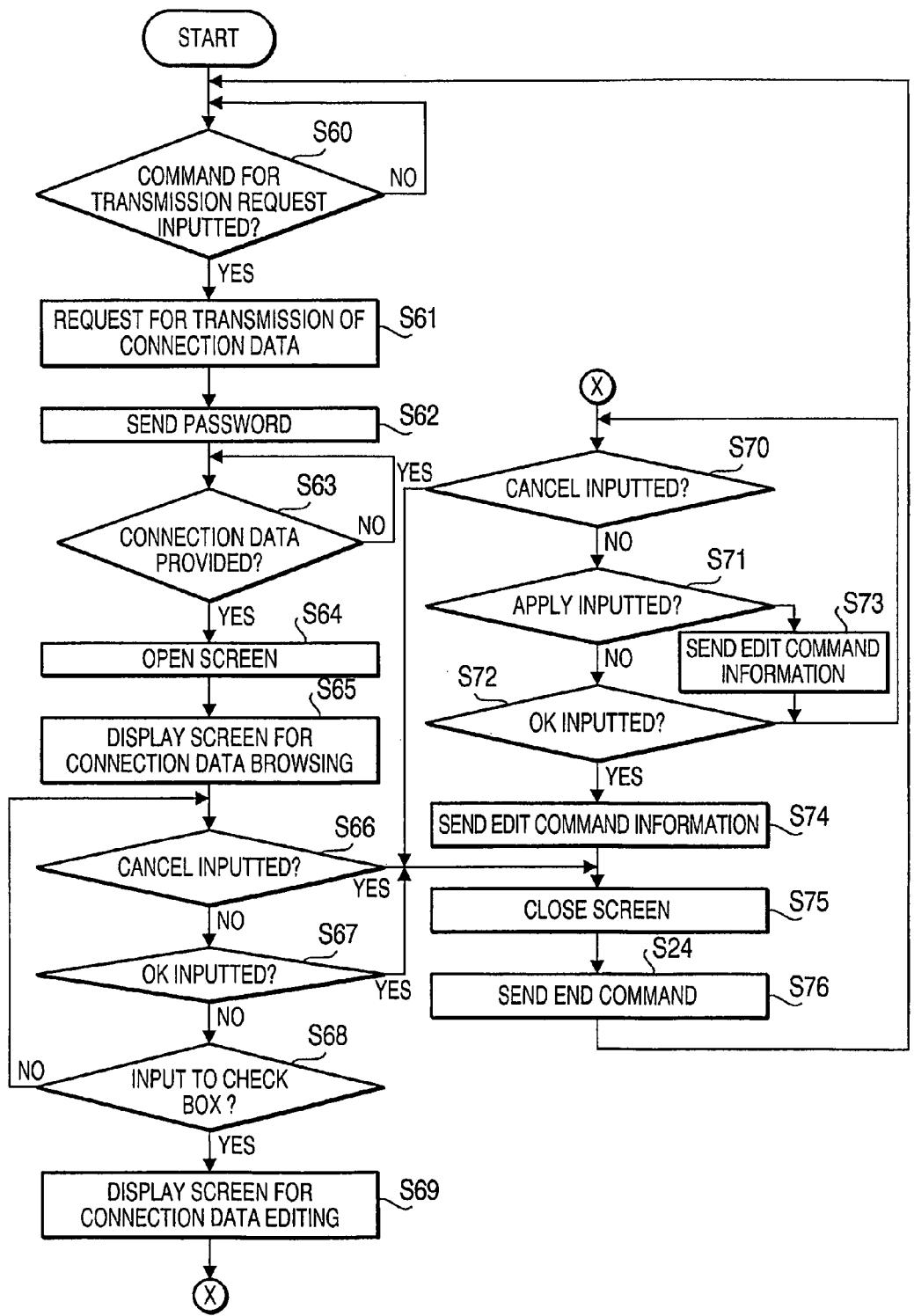
FIG. 9 is a flowchart illustrating an operation of the computer in a remote setup process according to the second embodiment of the present invention.

Operations of the printer 1 and the computer 2 in the remote setup mode will now be described. FIG. 8 is a flowchart illustrating the operation of the printer 1 in the remote setup mode. FIG. 9 is a flowchart illustrating the operation of the computer 2 in the remote setup mode.

As shown in FIG. 8, when the printer 1 is turned on, the printer 1 starts to operate based on the connection data stored in the NVRAM 13 (step S51). In the NVRAM 13, various types of changeable settings for the printer 1 are stored along with the connection data. The CPU 10 controls the wireless interface 19 based on the connection data in the NVRAM 13, and establishes a connection with the wireless access point 3. The printer 1 is thus incorporated into the network N.

Next, the printer 1 waits until a transmission request for connection data is sent from the computer 2 (step S52: NO). In this stage, if a print command from the computer 2 or a command from an external device (e.g., a facsimile device) is received, the printer 2 is able to process such incoming commands.

When the computer 2 is turned on, the computer 2 is also incorporated into the network N. Then, as shown in FIG. 9, the computer 2 waits until an input for the remote setup is received. The user is able to conduct the remote setup by initiating the connection data editing program on the computer 2. If the connection data editing program is initiated, the user is able to input a command of a transmission request for the connection data. After accepting the command for a transmission request (step S60), the computer 2 sends a transmission command for connection data to the printer 1 via the wireless interface 26 and the network N (step S61). Further, the computer 2 displays a password input screen on the display unit 25. If the user inputs a predetermined password through the password input screen, the computer 2 sends the password to the printer 1 via the wireless interface 26 and the network N (step S62).

As shown in FIG. 8, after receiving the transmission request for connection data from the printer 1 (step S52: YES), the printer 1 checks the received password (step S53). More specifically, the CPU 10 of the printer 1 reads a password, which is stored in the NVRAM 13 in association with the connection data edit window according to a control program in the ROM 11, from the NVRAM 13, and then compares the password read from the NVRAM 13 with the received password. If these passwords coincide with each other, the printer 1 sends the connection data stored in the NVRAM 13 to the computer 2 via the wireless interface 19 and the network N (step S54).

If the passwords do not coincide with each other, the printer 1 requests the computer 2 to re-input a password. Responding to the request for re-input of a password, the computer 2 displays the password input screen again. By such a configuration, it is possible to prevent an unauthorized user (a user not allowed to edit connection data) from editing connection data of the printer 1 through the network N. Then, the printer 1 waits until an edit command is transmitted from the computer 2 (step S55).

As shown in FIG. 9, after receiving the connection data (step S63: YES), the computer 2 displays a window for the connection data on the display unit 25 (step S64). Similarly to the example of the window shown in FIG. 6, each of the display fields for the items of the connection data is displayed in grayout, i.e., in a gray background color (the first background color). The user is able to browse the current settings of the connection data on the display unit 25 of the computer 2 (step S65). In the window, the user is allowed only to browse the settings, and is not allowed to edit the connection data. Therefore, even if a pointer of the pointing device is located on a display field in a gray background color and the pointing device is clicked, the cursor does not moves to the display field. Such a configuration makes it possible to prevent the connection data from being edited carelessly by a user.

As in the case of the first embodiment, the items displayed below "Setup TCP/IP" are the connection data of the printer 1 (see FIG. 6). At the bottom portion of the window, three buttons "OK", "Cancel" and "Apply" are displayed (see FIG. 6). The user selects and presses one of these buttons depending on a desirable command to be inputted. If the "OK" button or the "Cancel" button is clicked by the user through the window through which the user is only allowed to browse the connection data (step S66: YES or step S67: YES), the computer 2 closes the window (step S75). Next, the computer 2 sends an end commend to the printer 1 via the wireless interface 26 and the network N (step S76).

As shown in FIG. 8, if the printer 1 receives the end command (step S58: YES), the printer 1 changes to a standby state without changing the connection data in the NVRAM 13 (step S58). That is, the "Cancel" button is used as a command for canceling the already conducted remote setup operation. The "OK" button is used as a command for closing the window and for terminating the remote setup.

At the top portion of the window, an item for inputting an edit allowance command for changing the state of the window to a state in which editing for the items is allowed is displayed. As in the case of the first embodiment, words "Edit Network Settings" are displayed in the window (see FIG. 6), and a warning message against change of the settings is also displayed alongside of the words "Edit Network Settings".

If the user checks the check box displayed on the window (step S68: YES), the window changes to a state where the editing of the connection data is allowed as the case of the first embodiment (see FIG. 7) (step S69). In the window in which the editing of settings is allowed, a check mark is displayed on the check box, and the background color of a list box of "BOOT Method", each text box of "IP Address", "Subnet Mask", "Gateway", "Host Name", "WINS Server", "DNS Server?" and a list box of "APIPA" displayed under the "Setup TCP/IP" are changed from gray to white (i.e., a second background color). Such a change in background color enables the user to easily notice that the window has been changed to the state in which the editing of the items is allowed.

If the user clicks the "Cancel" button on the window in which the editing is allowed (step S70: YES), the window is closed regardless of whether the user has edited the connection data (step S75). Next, the computer 2 sends an end commend to the printer 1 via the wireless interface 26 and the network N (step S76). Then, control returns to step S60.

As shown in FIG. 8, after the printer 1 receives the end command (step S58: YES), the printer 1 changes to a standby state without changing the connection data in the NVRAM 13. The "Cancel" button is used as a command for canceling the already conducted remote setup operation.

If the "Apply" button on the window in which the editing is allowed is clicked (step S71: YES), the computer 2 sends the connection data currently inputted to the window to the printer 1 via the wireless interface 26, as edit command information (step S73). That is, the "Apply" button is used as a command representing the completion of editing of the connection data. The CPU 20 detects that the cursor has moved to the list box or the text box. By the edit command, connection data inputted to the detected box is sent to the printer 1.

As shown in FIG. 8, if the printer 1 receives the edit command information (step S55: YES), control proceeds to step S56 where the CPU 10 of the printer 1 changes the settings of the connection data in the NVRAM 13 based on the edit command information. That is, the CPU 10 functions to edit the connection data in the NVRAM 13 using the edit command information, and to store the edited connection data into the NVRAM 13. Then, the CPU 10 of the printer 1 establishes a connection with the network in accordance with the changed connection data (step S57).

If the user clicks the "OK" button in the window in which the editing is allowed (step S72: YES), the computer 2 sends the connection data currently inputted to the window to the printer 1 via the wireless interface 26 and the network N, as edit command information (step S74). Next, the computer 2 closes the window (step S75). Next, the computer 2 sends an end command to the printer 1 via the wireless interface 26 and the network N (step S76). That is, the "OK" button is used as a command representing the completion of editing of the connection data and completion of the remote setup.

As shown in FIG. 8, after receiving the edit command information (step S55: YES), control proceeds to step S56 where the CPU 10 of the printer 1 changes the settings of the connection data in the NVRAM 13 in accordance with the edit command information. Then, the CPU 10 of the printer 1 establishes a connection with the network based on the changed connection data (step S57). Subsequently, the printer 1 receives the end command and terminates the remote setup (step S58: YES). Then, the printer 1 changes to a standby state.

As described above, according to this embodiment, the connection data provided by the printer 1 for the computer 2 via the network N is displayed on the computer 2 in such a manner that the user is only allowed to browse the settings. In order to edit the connection data, the user is required to input the edit allowance command. Therefore, the connection data is not edited carelessly by the user unless the edit allowance command is inputted. Such a configuration makes it possible to prevent the network settings of the printer 1 from being carelessly changed by the user.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A network system for remotely setting up a network device from a host terminal, the network device and the host terminal being connected to a network,
   wherein the network device includes:
      a storage unit configured to store setting information; and
      a controller which performs a controlling operation in accordance with the setting information stored in the storage unit, and
   wherein the host terminal includes:
      a display unit on which information is displayed; and
      an input unit configured to accept user operation,
      wherein the network system has:
      a first state in which the controller of the network device operates to display the setting information on the display unit in response to a first signal being inputted to the controller through the input unit of the host terminal, the controller sets an input field of a dialog box for a first background color in the first state; and a second state in which the controller of the network device operates to display the setting information on the display unit in such a manner that editing of the setting information is allowed in response to a second signal being inputted to the controller via the network through use of the input unit of the host terminal during the first state, the controller sets the input field of the dialog box for a second background color in the second state.

2. The network system according to claim 1, wherein:
in the first state, the controller displays the setting information in an input field of a window on the display unit in such a manner that browsing of the setting information is allowed; and
the controller displays the setting information in such a manner that editing of the setting information is allowed in response to the second signal being inputted.

3. The network system according to claim 1, whether the second signal is outputted or not is determined according to whether a check box of a dialog box is checked in the first state.

4. The network system according to claim 1, wherein a connection data edit window displayed during the first state includes a warning.

5. The network system according to claim 1, wherein:
a connection data edit window displayed in the first state includes an input portion for an edit instruction and a warning; and
the input portion is displayed alongside the warning.

6. The network system according to claim 1, wherein connection data of the setting information includes an address of the network device.

7. The network system according to claim 1, wherein:
the network device includes a communication unit configured to communicate with an wireless access point or a wireless terminal; and
connection data of the setting information includes data for establishing a connection with the wireless access point or the wireless terminal.

8. The network system according to claim 1, wherein the network device includes:
a password storage unit configured to store a password;
a comparing unit configured to make a comparison for the password; and
a window providing unit configured to provide an edit window if a password from the host terminal coincides with the password stored in the password storage unit.

9. A network system for remotely setting up a network device from a host terminal, the network device and the host terminal being connected to a network,
wherein the network device includes:
a storage unit configured to store setting information; and
a controller which performs a controlling operation in accordance with the setting information stored in the storage unit,
wherein the host terminal includes:
a host side storage unit configured to store data;
a display unit on which information is displayed; and
an input unit configured to accept user operation,
wherein the network system has:
a first state in which the controller of the network device operates to store the setting information into the host side storage unit and to display the setting information on the display unit in such a manner that editing of the setting information is not allowed, in response to a first signal being inputted to the controller via the network through use of the input unit of the host terminal; and
a second state in which the setting information stored in the host side storage unit is displayed on the display unit in such a manner that editing of the setting information is allowed in response to a second signal being inputted through use of the input unit of the host terminal during the first state,
wherein the setting information stored in the network device is changed based on the setting information edited and stored in the host side storage unit and an update command inputted through the input unit in the second state, and
wherein, on the display unit of the host terminal, an input field of a dialog box is set for a first background color in the first state; and the input field of the dialog box is set for a second background color in the second state.

10. A computer program product for use on a host terminal which is connected to a network device via a network in a network system, wherein the network device includes a storage unit configured to store setting information and a controller which performs a controlling operation in accordance with the setting information stored in the storage unit, wherein the host terminal includes a host side storage unit configured to store data, a display unit on which information is displayed, and an input unit configured to accept user operation, the computer program product comprising computer readable instructions that cause the host terminal to:
store the setting information into the host side storage unit and to display the setting information on the display unit in such a manner that editing of the setting information is not allowed, in response to a first signal being inputted to the controller via the network through use of the input unit of the host terminal;
display the setting information stored in the host side storage unit on the display unit in such a manner that editing of the setting information is allowed in response to a second signal being inputted through use of the input unit of the host terminal during a first state in which editing of the setting information is not allowed; and
change the setting information stored in the network device based on the setting information edited and stored in the host side storage unit and an update command inputted through the input unit in a second state in which editing of the setting information is allowed,
set an input field of a dialog box on the display unit of the host terminal for a first background color in the first state; and the input field of the dialog box for a second background color in the second state.

11. The computer program product according to claim 10, wherein in the first state, the setting information is displayed in an input field of a window on the display unit in such a manner that browsing of the setting information is allowed.

12. The computer program product according to claim 10, whether the second signal is outputted or not is determined according to whether a check box of a dialog box is checked in the first state.

13. The computer program product according to claim 10, wherein a connection data edit window displayed during the first state includes a warning.

14. The computer program product according to claim 10, wherein:
a connection data edit window displayed in the first state includes an input portion for an edit instruction and a warning; and the input portion is displayed alongside the warning.

15. The computer program product according to claim 10, wherein connection data of the setting information includes an address of the network device.

16. The computer program product according to claim 10, wherein the computer program product comprises a memory that stores the instructions.

17. The computer program product according to claim 16, wherein the memory comprises a computer hard disk.

18. The computer program product according to claim 16, wherein the memory comprises a removable memory.

19. A computer program product for use on a network device which is connected to a host terminal via a network in a network system, wherein the network device includes a storage unit configured to store setting information, and a controller which performs a controlling operation in accordance with the setting information stored in the storage unit, wherein the host terminal includes a display unit on which information is displayed, and an input unit configured to accept user operation, the computer program product comprising computer readable instructions that cause the network device to:
 display the setting information on the display unit in response to a first signal being inputted to the controller through the input unit of the host terminal;
 display the setting information on the display unit in such a manner that editing of the setting information is allowed in response to a second signal being inputted to the controller via the network through use of the input unit of the host terminal; and
 set, by the controller, an input field of a dialog box for a first background color in response to the first signal, and the input field of the dialog box for a second background color in response to the second signal.

20. A method of remotely setting up a network device from a host terminal, the network device and the host terminal being connected to a network, wherein the network device includes a storage unit configured to store setting information, and a controller which performs a controlling operation in accordance with the setting information stored in the storage unit, wherein the host terminal includes a display unit on which information is displayed, and an input unit configured to accept user operation, the method comprising the steps of:
 displaying the setting information on the display unit in response to a first signal being inputted to the controller through the input unit of the host terminal;
 displaying the setting information on the display unit in such a manner that editing of the setting information is allowed in response to a second signal being inputted to the controller via the network through use of the input unit of the host terminal; and
 setting, by the controller, an input field of a dialog box for a first background color in response to the first signal, and the input field of the dialog box for a second background color in response to the second signal.

21. A method of remotely setting up a network device from a host terminal which is connected to the network device via a network in a network system, wherein the network device includes a storage unit configured to store setting information and a controller which performs a controlling operation in accordance with the setting information stored in the storage unit, wherein the host terminal includes a host side storage unit configured to store data, a display unit on which information is displayed, and an input unit configured to accept user operation, the method comprising the steps of:
 storing the setting information into the host side storage unit and displaying the setting information on the display unit in such a manner that editing of the setting information is not allowed, in response to a first signal being inputted to the controller via the network through use of the input unit of the host terminal;
 displaying the setting information stored in the host side storage unit on the display unit in such a manner that editing of the setting information is allowed in response to a second signal being inputted through use of the input unit of the host terminal during a first state in which editing of the setting information is not allowed;
 changing the setting information stored in the network device based on the setting information edited and stored in the host side storage unit and an update command inputted through the input unit in a second state in which editing of the setting information is allowed; and
 setting, on the display unit of the host terminal, an input field of a dialog box for a first background color in the first state and the input field of the dialog box for a second background color in the second state.

22. A network system for remotely setting up a network device from a host terminal, the network device and the host terminal being connected to a network,
 wherein the network device includes:
  a storage unit configured to store setting information; and
  a controller which performs a controlling operation in accordance with the setting information stored in the storage unit,
 wherein the host terminal includes:
  a display unit on which information is displayed; and
  an input unit configured to accept user operation,
 wherein the network system has:
  a first state in which the controller of the network device operates to display the setting information on the display unit in response to a first signal being inputted to the controller through the input unit of the host terminal, a connection data edit window displayed during the first state includes a warning; and
  a second state in which the controller of the network device operates to display the setting information on the display unit in such a manner that editing of the setting information is allowed in response to a second signal being inputted to the controller via the network through use of the input unit of the host terminal during the first state.

23. A computer program product for use on a network device which is connected to a host terminal via a network in a network system, wherein the network device includes a storage unit configured to store setting information, and a controller which performs a controlling operation in accordance with the setting information stored in the storage unit, wherein the host terminal includes a display unit on which information is displayed, and an input unit configured to accept user operation, the computer program product comprising computer readable instructions that cause the network device to:
 display the setting information on the display unit in response to a first signal being inputted to the controller through the input unit of the host terminal;
 display a connection data edit window including a warning in response to the first signal; and
 display the setting information on the display unit in such a manner that editing of the setting information is allowed in response to a second signal being inputted to the controller via the network through use of the input unit of the host terminal.

24. A method of remotely setting up a network device from a host terminal, the network device and the host terminal being connected to a network, wherein the network device includes a storage unit configured to store setting information, and a controller which performs a controlling operation in accordance with the setting information stored in the storage unit, wherein the host terminal includes a display unit on which information is displayed, and an input unit configured to accept user operation, the method comprising the steps of:

displaying the setting information on the display unit in response to a first signal being inputted to the controller through the input unit of the host terminal;

displaying a connection data edit window including a warning in response to the first signal; and displaying the setting information on the display unit in such a manner that editing of the setting information is allowed in response to a second signal being inputted to the controller via the network through use of the input unit of the host terminal.

* * * * *